United States Patent [19]

Morlotti

[11] Patent Number: 5,003,181

[45] Date of Patent: Mar. 26, 1991

[54] METHOD FOR RECORDING AND REPRODUCING A RADIATION IMAGE, PANEL AND PHOSPHORS FOR STORING A RADIATION IMAGE

[75] Inventor: Romano Morlotti, Savona, Italy

[73] Assignee: Minnesota Mining and Manufacturing Company, St. Paul, Minn.

[21] Appl. No.: 498,323

[22] Filed: Mar. 23, 1990

[30] Foreign Application Priority Data

Apr. 7, 1989 [IT] Italy ................................ 20048 A/89

[51] Int. Cl.$^5$ .......................... G01T 1/00; C09K 11/79
[52] U.S. Cl. ................................ 250/484.1; 250/327.2; 252/301.4 F; 428/690
[58] Field of Search ............... 252/301.4 F; 250/484.1, 250/327.2; 428/690

[56] References Cited

U.S. PATENT DOCUMENTS

| | | | |
|---|---|---|---|
| 2,569,939 | 10/1951 | Lyon | 252/301.4 F |
| 3,935,119 | 1/1976 | Barber et al. | 252/301.4 F |
| 4,261,854 | 4/1981 | Kotera et al. | 252/301.4 F |
| 4,741,993 | 5/1988 | Kano et al. | 250/484.1 |
| 4,894,583 | 1/1990 | Berkstresser et al. | 252/301.4 F |

FOREIGN PATENT DOCUMENTS

| | | | |
|---|---|---|---|
| 2035258 | 3/1972 | Fed. Rep. of Germany | 252/301.4 F |
| 7603429 | 4/1975 | Netherlands | 252/301.4 F |

*Primary Examiner*—Jack Cooper
*Attorney, Agent, or Firm*—Gary L. Griswold; Walter N. Kirn; Mark A. Litman

[57] ABSTRACT

A method for recording and reproducing a radiation image comprising the steps of (i) causing a visible or infrared radiation stimulable phosphor to absorb a high-energy radiation passing through an object, (ii) stimulating said phosphor with visible or infrared radiation to release the stored energy as fluorescent light and (iii) detecting said fluoroescent light with light detecting means, is characterized by the fact that the photostimulable phosphor is selected within the group of rare earth orthosilicates activated with a first activator comprising cerium and/or terbium and a second activator comprising zirconium and/or samarium, wherein rare earth is one of (a) yttrium, (b) yttrium and lutetium and (c) yttrium, lutetium and gadolinium.

Panel for storing a radiation image containing the above described photostimulable phosphors.

Phosphors selected within the group of rare earth orthosilicates activated with a first activator comprising certium and/or terbium and a second activator comprising zirconium and/or samarium, wherein rare earth is one of (a) yttrium, (b) yttrium and lutetium and (c) yttrium, lutetium and gadolinium.

7 Claims, No Drawings

METHOD FOR RECORDING AND REPRODUCING A RADIATION IMAGE, PANEL AND PHOSPHORS FOR STORING A RADIATION IMAGE

FIELD OF THE INVENTION

This invention refers to a method for recording and reproducing a radiation image by causing a visible or infrared radiation stimulable phosphor to absorb high-energy radiation passing through an object, stimulating said phosphor to release the stored energy as fluorescent light and detecting said fluorescent light, the photostimulable phosphor being selected within the group of rare earth orthosilicates activated with a first activator comprising cerium and/or terbium and a second activator comprising zirconium and/or samarium, wherein said rare earth is one of (a) yttrium, (b) yttrium and lutetium and (c) yttrium, lutetium and gadolinium.

BACKGROUND OF THE ART

U.S. Pat. No. 3,859,527 describes a method for recording and reproducing a high-energy radiation image using a panel for storing a radiation image comprising a stimulable phosphor which emits light when stimulated with visible or infrared radiations after exposure to such radiation (wherein high-energy radiation means an electromagnetic wave or corpuscular radiation such as X-rays, $\alpha$-rays, $\beta$-rays, gamma-rays, neutrons, ultraviolet rays, or the like).

U.S. Pat. No. 4,258,264 describes a method and apparatus for reproducing a radiation image by stimulating a storing phosphor with stimulating rays, the wavelengths of which are in the range from 600 to 700 nm, and detecting the stimulated light by means of a light detector, the detected light being in the range from 300 to 500 nm.

European patent application 111,893 describes a method for recording and reproducing a radiation image comprising the steps of (i) causing a radiation image storing panel to absorb a radiation passing through an object, such a panel containing a divalent europium activated barium fluorochloride phosphor, (ii) exposing said panel to an electromagnetic wave having a wavelength in the range from 400 to 550 nm to release the stored radiation energy as fluorescent light and (iii) detecting said fluorescent light.

U.S. Pat. No. 4,261,854 describes a barium fluorohalide phosphor represented by the formula BaFX:x-Ce,yA, wherein X is at least one halogen atom selected from the group consisting of chlorine, bromine and iodine, A is at least one metallic element selected from the group consisting of indium, thallium, gadolinium, samarium and zirconium, and x and y are numbers satisfying the conditions of $10^{-6} \leq x \leq 0.2$ and $10^{-5} \leq y \leq 0.05$, respectively.

European patent application 109,207 (corresponding to U.S. Pat. No. 4,654,533) describes a method for reading out a radiation image pattern recorded in a stimulable phosphor in which the phosphor is acnned by an Ar+ laser beam having a stimulating wavelength of about 514.5 nm.

GB patent 1,336,518 describes a phosphor material, prepared by activating a matrix consisting of lutetium and yttrium silicates with trivalent cerium, adapted for use with a fluorescent lamp and x-ray tube. When excited by electron beams or UV rays, this phosphor material emits a bluish-violet luminescence.

DE patent application 2,202,485 describes a cerium activated yttrium silicate phosphor suitable for flying-spot tubes, especially amplifying tubes for isotope dragnosis in gamma-chambers.

European patent application 88120638.7 describes terbium and/or cerium activated ternary lutetium-gadolinium-yttrium silicates for use in direct radiography When said phosphors are excited by x-rays, they emit violet, blue and green luminescence.

Generally speaking, the overall luminescence is a significant parameter for almost all phosphor applications. On the contrary, for radiographic applications using photostimulable phosphors, the relevant luminescence is that in the band of higher sensitivity of the photodetector which is coupled to the phosphor panel for detecting the emitted light Therefore, the general task in this field is to find more efficient phosphors.

U.S. Pat. No. 4,236,078 describes a method for recording and reproducing a radiation image by using visible or infrared radiation stimulable phosphors. In such patent, the inventor tested a series of stimulable phosphors and found that the SrS:Ce,Sm type phosphors (mentioned in the above cited U.S. Pat. No. 3,859,527) have a very low stimulability when they are stimulated both with visible and infrared radiation.

Some experiments, performed by the Applicant of the present patent application, have evidenced that, while LaOBr:Ce phosphor has a high stimulability, the addition of samarium as a second activator makes the stimulability of LaOBr:Ce,Sm phosphor be decreased to 30% of the value obtained in absence of samarium as a second activator.

SUMMARY OF THE INVENTION

Useful phosphors to be used in panels and methods for recording and reproducing a high-energy radiation image, including the steps of stimulating with visible or infrared radiation a phosphor image-wise exposed to a high-energy radiation and detecting the fluorescent light emitted by said phosphor upon stimulation, were found to be those characterized by being rare earth orthosilicates activated with a first activator comprising cerium and/or terbium and a second activator comprising zirconium and/or samarium, wherein said rare earth is one of (a) yttrium, (b) yttrium and lutetium and (c) yttrium, lutetium and gadolinium.

DETAILED DESCRIPTION OF THE INVENTION

The present invention refers to a method for recording and reproducing a radiation image comprising the steps of (i) causing a visible or infrared radiation stimulable phosphor to absorb a high-energy radiation passing through an object, (ii) stimulating said phosphor with visible or infrared radiation to release the stored energy as fluorescent light and (iii) detecting said fluorescent light with light detecting means, said method being characterized by the fact that said phosphor is selected within the group of rare earth orthosilicates activated with a first activator comprising cerium and-/or terbium and a second activator comprising zirconium and/or samarium, wherein said rare earth is one of (a) yttrium, (b) yttrium and lutetium and (c) yttrium, lutetium and gadolinium.

Preferably, the present invention refers to a method as described above wherein said phosphor is represented by the formula:

$$Y_xLu_yGd_zSiO_5:aA,bB \quad (1)$$

wherein $x+y+z=2$, $x>0$, $y>0$, $z>0$, A is cerium and/or terbium, B is zirconium and/or samarium, $2\times10^{-5} < a < 0.02$ and $2\times10^{-5} < b < 0.02$.

In particular, the present invention refers to the method described above where the wavelength of said stimulating radiation is in the range from 480 to 1000 nm.

More in particular, the present invention refers to the method described above where the wavelength of said stimulating radiation is in the range from 480 to 600 nm, preferably from 500 to 550 nm, more preferably is about 510 to 520 nm and most preferably about 514.5 nm corresponding to the emission of an Argon laser apparatus.

In another aspect, the present invention refers to a method for recording and reproducing a radiation image comprising the steps of (i) causing an infrared radiation stimulable phosphor to absorb a high-energy radiation passing through an object, (ii) stimulating said phosphor with infrared radiation to release the stored energy as fluorescent light and (iii) detecting said fluorescent light with light detecting means, said method being characterized by the fact that said phosphor is selected within the group of rare earth orthosilicates activated with a first activator comprising cerium and/or terbium and a second activator comprising samarium, wherein said rare earth is one of (a) yttrium, (b) yttrium and lutetium and (c) yttrium, lutetium and gadolinium.

Preferably, the present invention refers to the method described above wherein said phosphor is represented by the formula:

$$Y_xLu_yGd_zSiO_5:aA,bSm \quad (2)$$

wherein $x+y+z=2$, $x>0$, $y>0$, $z>0$, A is cerium and/or terbium, $2\times10^{-5} < a < 0.02$ and $2\times10^{-5} < b < 0.02$.

In particular, the present invention refers to the method described above where the wavelength of said stimulating radiation is in the range from 750 to 1000 nm, preferably from 750 to 850 nm.

In a further aspect, the present invention refers to a high-energy radiation image storing panel which is provided with a fluorescent layer comprising a binder and a photostimulable phosphor dispersed in said binder, wherein said photostimulable phosphor is selected within the group of rare earth orthosilicates activated with a first activator comprising cerium and/or terbium and a second activator comprising zirconium and/or samarium, wherein said rare earth is one of (a) yttrium, (b) yttrium and lutetium and (c) yttrium, lutetium and gadolinium.

In a still further aspect, the present invention refers to a phosphor selected within the group of rare earth orthosilicates activated with a first activator comprising cerium and/or terbium and a second activator comprising zirconium and/or samarium, wherein said rare earth is one of (a) yttrium, (b) yttrium and lutetium and (c) yttrium, lutetium and gadolinium.

The method for recording and reproducing a high-energy radiation image using a radiation image storing panel of the present invention schematically comprise: a high-energy radiation source, an object, a radiation image storing panel, a light source emitting stimulating radiations which stimulate the fluorescent layer of the panel to release the stored radiation energy as fluorescent light, a filter to absorb the radiations emitted by the light source and reflected by the panel and transmit only the fluorescent light emitted by the panel and a focusing lens to collect the light emitted by the panel and passed through the filter. The combination of a photodetector with a photomultiplier is used to detect and convert the light emitted by the panel into electrical signals, the electrical signal being amplified by means of an amplifier and such amplified electrical signal being evaluated with a data analyzer.

Means to cause a visible radiation stimulable phosphor to absorb a high-energy radiation passing through an object are known in the art, as described in U.S. Pat. No. 4,239,968. They include the high-energy radiation source (such as e.g. an x-ray tube) and a radiation image storing panel similar to that of the present invention including a phosphor different from that of the present invention. When the phosphor is exposed to x-rays, the radiation passes through the object. The intensity of the radiation passed through the object represents the transmittance factor of the object. Furthermore, an image representing the transmittance pattern of the object is obtained by means of a radiation impinging onto the panel. The radiation is absorbed by the fluorescent layer of the panel and electrons or holes are generated in the fluorescent layer proportionally to the quantity of the absorbed radiation. The electrons or holes are stored in the traps of the rare earth orthosilicate phosphor activated with a first activator comprising cerium and/or terbium and with a second activator comprising zirconium and/or samarium, wherein said rare earth is one of (a) yttrium, (b) yttrium and lutetium and (c) yttrium, lutetium and gadolinium, of the present invention.

The radiation image stored in the panel is displayed upon stimulation with a stimulating radiation beam. It is known in the art that the means for stimulating said panel with visible or infrared radiation include stimulating radiation source means emitting in the visible or infrared field, such as for instance, respectively, an Argon laser emitting a 514.5 nm laser beam, as described in European patent application Ser. No. 111,893 and a QJ 0.06 mW lamp emitting at 800 nm. A scanning apparatus allows the fluorescent layer of the panel to be scanned with stimulating radiation emitted by a light source, as described in U.S. Pat. No. 4,258,264. Focusing means allow said stimulating light to be focused onto the panel in a small spot (e.g. 0.7 mm²), as described in U.S. Pat. No. 4,258,264. The electrons or holes stored in the traps of the photostimulable phosphors contained in the panel are expelled therefrom and the radiation image stored in the panel is released as fluorescent light. The luminescence of the fluorescent light emitted by the panel is proportional to the number of electrons or holes stored in the fluorescent layer of the panel and, therefore, to the amount of radiation absorbed therein.

It is known in the art that means for detecting said fluorescent light emitted by the panel include: (a) interference filters, the transmission peak of which is tuned with the wavelength of the signal emitted by the sample, to filter the unwanted stimulating light (such as e.g. a Schott BG1 filter); (b) optical means to collect the light emitted by the panel such as for instance light guiding means having a linear or arched end portion to be placed adjacent to a scanning line of the photostimulable phosphor to receive and guide the light emitted by the phosphor and an annular end portion to be placed adjacent to the surface of the light detector which receives the light, as described in U.S. Pat. No. 4,346,295. Optical means useful to collect the light emitted by the panel are in particular represented by elliptical mirrors having their concave side turned towards the panel and having an opening for the passage of such stimulating radiation, as described in European patent application Ser. No. 210,505; (c) the combination of a photosensor and a photomultiplier to detect the fluorescent light and convert it into electrical signals (such as for instance a Thorn Emi 9558 QB photomultiplier); (d) means to amplify the signal (such as for example an EG&G Parc Model 181 amplifier) and (e) evaluation means to evaluate the obtained electrical signal (corresponding to the original high-energy radiation image), such as for example a data analyzer apparatus.

According to the present invention, the controlled addition of cerium and/or terbium, as first activators, and of zirconium and/or samarium, as second activators, according to the above reported formulas was found to facilitate the formation of anionic vacancies in the rare earth orthosilicate phosphor matrix. Such anionic vacancies are thought to be the cause of the storing capability of such phosphors.

In particular, the luminescence of the fluorescent light emitted by the stimulable phosphor selected within the group of rare earth orthosilicate phosphors activated with cerium and/or terbium, as first activators, and with zirconium and/or samarium, as second activators, wherein rare earth is one of (a) yttrium, (b) yttrium and lutetium and (c) yttrium, lutetium and gadolinium, of the present invention was found to be higher when such phosphors were stimulated with a stimulating radiation having a wavelength in the range from 500 to 600 nm, such as for example an Argon laser having a wavelength of 514.5 nm.

When according to the present invention the phosphors (of the present invention) are stimulated with stimulating radiation having a wavelength in the range from 500 to 600 nm and the emitted fluorescent light is detected with a wavelength of about 400 nm, in the range from 370 to 480 nm, it is useful to use a filter which allows the reflected stimulating light to be separated from the light emitted by the panel containing such phosphors. To this purpose it is necessary to use filters absorbing the light having a wavelength higher than 480 nm, thus allowing the detecting means of the fluorescent light emitted by the phosphors to be reached only by the light having a wavelength lower than 480 nm, leaving apart the reflected stimulating light.

When stimulated with infrared radiation in the range from 750 to 100 nm, preferably in the range from 750 to 850 nm, particularly useful phosphors according to this invention are phosphors selected within the group of rare earth orthosilicates activated with a first activator comprising cerium and/or terbium and with a second activator comprising samarium, wherein said rare earth is one of (a) yttrium, (b) yttrium and lutetium and (c) yttrium, lutetium and gadolinium, preferably those corresponding to the above formula (2).

The preparation of the phosphor samples of the present invention has been performed according to a gel process, which will be described in general; specific numerical values are given in the examples.

A solution was prepared by dissolving lutetium and yttrium oxides, terbium and/or cerium oxides and zirconium and/or samarium oxides or nitrates in diluted nitric acid. The solution was thoroughly mixed with tetraethylorthosilicate (TEOS) together with alcohol (e.g. ethanol).

Then a gel was formed by adding an excess of 25% diluted ammonia. The gel was dried for some days at about 70° C. and (after having been divided e.g. in a suitable mill or in an agate mortar) finally fired in a heat resistant crucible (e.g. an alumina or quartz crucible), by heating many times at gradually increasing temperatures (up to 1400°-1600° C.) in air or, possibly, in argon, nitrogen, nitrogen-hydrogen or nitrogen-carbon oxides atmosphere.

Different amounts of raw materials were used to obtain different phosphors, as reported in the following examples.

With the gel process, it has been found that the resulting silicate has predominantly an orthosilicatic structure; the apathitic structure is almost absent or present in very small amounts.

With other processes like the well-known flux process and solid state process, the amount of the apathitic structure has been found to increase and the performances of the phosphors to worsen.

The panels of the present invention normally comprise a fluorescent layer including a binder and, dispersed therein, at least one phosphor selected within the group of the above said rare earth orthosilicates, activated with cerium and/or terbium, as first activators, and with zirconium and/or samarium, as second activators, wherein rare earth is one of (a) yttrium, (b) yttrium and lutetium and (c) yttrium, lutetium and gadolinium, of the present invention. The fluorescent layer is formed by dispersing the phosphor in the binder to prepare a coating dispersion and then coating the coating dispersion according to conventional coating methods to form a uniform layer.-Although the fluorescent layer itself can be a radiation image storing panel if the fluorescent layer is self-supporting, to form a radiation image storing panel the fluorescent layer generally consists of a support base. Moreover, the surface of the fluorescent layer is in general overcoated with a protective layer for physically and chemically protecting the fluorescent layer itself. Furthermore, a sub-layer can be coated between the fluorescent layer and the support base for strictly binding them together.

The binders used in the fluorescent layer of the radiation image storing panel of the present invention may be those commonly used for the formation of layers, such as gum arabic, proteins like gelatin, polysaccharides like dextrane, organic polymeric binders like vinylbutyrale, polyvinylacetate, nitrocellulose, ethylcellulose, vinylidenechloride-vinylchloride copolymers, polymethylmethacrylate, polybutylmethacrylate, vinylchloride-vinylacetate copolymers, polyurethane, cellulose acetate-butyrate, polyvinyl alcohol, and the like.

In general, the binder is used in a quantity ranging from 0.01 to 1 part by weight per each part by weight of phosphor. However, with respect to sensitivity and sharpness of the obtained panel, the binder quantity should preferably be small. Consequently, under consideration of the sensitivity and sharpness of the panel and of the easiness of use of the coating dispersion, the binder is preferably used in a quantity ranging from 0.03 to 0.2 parts by weight per each part by weight of the stimulable phosphor. The thickness of the fluorescent layer is generally comprised in the range from 10 μm to 1 mm.

In the radiation image storing panel of the present invention, the fluorescent layer is generally coated on a support base. As a base there can be employed various materials such as polymeric materials, glass, wool, cotton, paper, metal and the like. From the point of view of the use of the panel as information recording means, the support shall preferably be treated in the form of a flexible sheet or roll. To this purpose, the preferred support base is an organic polymeric film such as a cellulose acetate, polyester, polyethyleneterephthalate, polyamide, triacetate, polycarbonate film, or the like or normal paper or treated paper, such as photographic paper, barytha-coated paper, resin-coated paper, pigment containing paper such as titannium dioxide, or the like. On one side (that coated with the fluorescent layer) the support base can be provided with a sub-layer for closely binding the fluorescent layer. The sub-layer material may be any conventional adhesive material. In the coating operation of the fluorescent layer onto the support base or sub-layer, a coating composition comprising the phosphor dispersed in a binder can be applied directly to the support base or to a sub-layer to form the fluorescent layer. Alternatively, a fluorescent layer formed beforehand may be bound to the support base or sub-layer. When the used support base is permeable to the phosphor stimulating radiations, the radiation image storing panel can be exposed to the stimulating radiations at the base side.

Furthermore, in the radiation image storing panel of the present invention, on the surface of the fluorescent layer on the exposure side (i.e. that opposite to the support base) there is applied in general a protective layer in order to give the fluorescent layer a chemical and physical protection. If, as said above, the fluorescent layer is self-supporting, the protective layer can be coated on both surfaces of the fluorescent layer. The protective layer can be coated onto the fluorescent layer by directly applying a coating dispersion to form the protective layer or binding thereto the protective layer formed beforehand. As a material for the protective layer, a conventional material for protective layers can be used, such as nitrocellulose, ethylcellulose, cellulose acetate, polyester, polyethyleneterephthalate, and the like.

The radiation image storing panel of the present invention can be colored with a dye. Furthermore, the fluorescent layer on the radiation image storing panel of the present invention can contain a white powder dispersed therein. By using a dye or a white powder, a radiation image storing panel giving a very sharp image can be obtained.

The present invention is now illustrated with more details by making reference to the following examples.

EXAMPLE 1

Preparation of $Y_{0.8}Lu_{1.2}SiO_5:0.001Ce, 0.00075Zr$ phosphor (Compound no. 2 of following Table 1)

The following starting materials were used:

| | |
|---|---|
| $Lu_2O_3$ | 2.3000 grams |
| $Y_2O_3$ | 0.9032 grams |
| $CeO_2$ | 0.0017 grams |
| $Zr(NO_3)_4.5H_2O$ | 0.0031 grams |
| TEOS | 0.2350 grams |

The first four materials were dissolved in a mixture of $H_2O$ and $HNO_3$. The solution, kept under stirring, was added with the same volume of ethyl alcohol and TEOS.

A gel was precipitated by adding $NH_4OH$, and dried for 3 days at 70° C. The dried gel was then treated for 2 h at 200° C., 2 h at 300° C., 2 h at 500° C., 2 h at 700° C., 100 h at 1300° C. and 4 h at 1400° C. During the 100 h period at 1300° C., the material was cooled at room temperature and homogenized in an agate mortar three times. finally, the material was cooled at room temperature.

The resulting phosphor may be represented by the following formula:

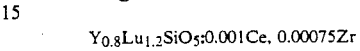

$Y_{0.8}Lu_{1.2}SiO_5:0.001Ce, 0.00075Zr$

EXAMPLE 2

Preparation of $Y_{0.8}Lu1.2SiO_5:0.001Ce, 0.001Sm$ phosphor (Compound no. 3 of following Tables 1 and 2)

The following starting materials were used:

| | |
|---|---|
| $Lu_2O_3$ | 2.3000 grams |
| $Y_2O_3$ | 0.9032 grams |
| $CeO_2$ | 0.0017 grams |
| $Sm_2O_3$ | 0.0031 grams |
| TEOS | 0.2350 grams |

The first four materials were dissolved in a mixture of $H_2O$ and $HNO_3$. The solution, kept under stirring, was added with the same volume of ethyl alcohol and TEOS and treated as described in Example 1.

The resulting phosphor may be represented by the following formula:

$Y_{0.8}Lu_{1.2}:0.001Ce, 0.00075Sm$

EXAMPLE 3

Preparation of $Y_{0.8}Lu_{1.2}SiO_5: 0.001Ce, 0.001Sm, 0.001Zr$ phosphor (Compound no. 4 of following Table 1)

The following starting materials were used:

| | |
|---|---|
| $Lu_2O_3$ | 2.3000 grams |
| $Y_2O_3$ | 0.9032 grams |
| $CeO_2$ | 0.0017 grams |
| $Sm_2O_3$ | 0.0017 grams |
| $Zr(NO_3)_4.5H_2O$ | 0.0042 grams |
| TEOS | 0.2350 grams |

The first five materials were dissolved in a mixture of $H_2O$ and $HNO_3$. The solution, kept under stirring, was added with the same volume of ethyl alcohol and TEOS and treated as described in Example 1.

The resulting phosphor may be represented by the following formula:

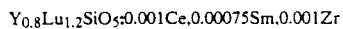

$Y_{0.8}Lu_{1.2}SiO_5:0.001Ce,0.00075Sm,0.001Zr$

EXAMPLE 4

The compounds nos. 5–33 were prepared in the same way as the compounds of Example 1.

EXAMPLE 5

Reference phosphor A and phosphor samples (Compounds nos. 1 to 33 of following Table 1), obtained with the preparations described in Examples 1 to 4 were for 10 seconds exposed to 40 KVp and 10 mA x-rays filtered with 1 mm Be. After 2 minutes such samples were stimulated for 2 seconds with a 514.5 nm wavelength light beam emitted by a QJ 100 W 12 V lamp and passed through a 03 FIL 004 narrow band filter (Melles Griot) having a 60% transmittance, placed between the light source and the sample. The intensity of the stimulating light was measured with a photometer (Mod. 450-1 Photometer of EG&G, Elettrooptics), connected with an attenuator (Mod. 550-11 of the same firm). The photostimulated light emitted by the phosphor was collected with a photomultiplier (Thorn-Emi 9635 QB type) and converted into electrical signals, while the unwanted stimulating light reflected by the phosphor was absorbed by a collecting filter (Schott BG-1 with 8.5 mm opening). Such a filter is capable of transmitting the radiations having a wavelength between 270 and 500 nm (transmitting at least 60% of the signal between 300 and 450 nm) and preventing the passage of the radiations having a wavelength between 530 and 670 nm. To improve the blocking power for 514 nm radiation, two interferential filters have been used; their transmittance is less than 1% at about 514 nm and more than 70% in the range of 400 to 490 nm. The electrical signal was amplified by means of a combination of a EG&G Parc Model 181 type pre-amplifier and a EG&G Parc Model 113 type amplifier. The signal was then evaluated with a Data Precision 6000 type data analyzer of Division Analogic Corp.

The following Table 1 reports the emission values of the phototimulated light emitted by the phosphors prepared according to Examples 1 to 4 and treated as described in this example (stimulated at 514.5 nm).

TABLE 1

| Comp. | Matrix | Activator 1 | Activator 2 | Emission efficiency |
|---|---|---|---|---|
| 1. | $Y_2SiO_5$ | 0.001Ce | 0.001Sm | 100 |
| 2. | $Y_{0.5}Lu_{1.2}SiO_5$ | 0.001Ce | 0.00075Zr | 600 |
| 3. | $Y_{0.5}Lu_{1.2}SiO_5$ | 0.001Ce | 0.001Sm | 200 |
| 4. | $Y_{0.5}Lu_{1.2}SiO_5$ | 0.001Ce | 0.001Sm 0.001Zr | 330 |
| 5. | $Y_{0.5}Lu_{1.2}SiO_5$ | 0.001Ce | 0.00050Zr | 530 |
| 6. | $Y_{0.5}Lu_{1.2}SiO_5$ | 0.001Ce | 0.001Zr | 486 |
| 7. | $Y_{0.5}Lu_{1.2}SiO_5$ | 0.001Ce | 0.01Zr | 192 |
| 8. | $Y_{0.5}Lu_{1.2}SiO_5$ | 0.01Ce | 0.001Zr | 234 |
| 9. | $Y_{0.5}Lu_{1.2}SiO_5$ | 0.01Ce | 0.01Zr | 180 |
| 10. | $Y_{0.5}Lu_{1.2}SiO_5$ | 0.001Tb | 0.001Zr 0.001Ce | 266 |
| 11. | $Y_{0.4}Lu_{1.6}SiO_5$ | 0.001Ce | 0.001Zr | 330 |
| 12. | $Y_{1.2}Lu_{0.8}SiO_5$ | 0.001Ce | 0.001Zr | 380 |
| 13. | $Y_{1.2}Lu_{0.8}SiO_5$ | 0.001Ce | 0.001Sm | 220 |
| 14. | $Y_{0.9}Lu_{0.3}Gd_{0.8}SiO_5$ | 0.001Ce | 0.001Sm | 150 |
| 15. | $Y_{0.9}Lu_{0.3}Gd_{0.8}SiO_5$ | 0.001Ce | 0.001Sm | 110 |
| 16. | $Y_2SiO_5$ | 0.001Ce | 0.001Zr 0.001Sm | 150 |
| 17. | $Y_2SiO_5$ | 0.001Tb | 0.001Sm | 125 |
| 18. | $Y_2SiO_5$ | 0.001Ce | 0.001Sm 0.001Tb | 90 |
| 19. | $Y_2SiO_5$ | 0.001Ce | 0.001Zr | 200 |
| 20. | $Y_2SiO_5$ | 0.001Ce | 0.0025Zr | 250 |
| 21. | $Y_2SiO_5$ | 0.01Ce | 0.001Zr | 150 |
| 22. | $Y_2SiO_5$ | 0.001Tb | 0.001Zr | 136 |
| 23. | $Y_2SiO_5$ | 0.001Tb | 0.001Zr 0.001Sm | 206 |
| 24. | $Y_2SiO_5$ | 0.001Ce | 0.001Zr 0.001Tb | 360 |
| 25. | $Y_2SiO_5$ | 0.001Ce | 0.001Zr 0.010Tb | 268 |
| 26. | $Y_2SiO_5$ | 0.010Ce | 0.001Zr 0.001Tb | 231 |
| 27. | $Y_{0.8}Lu_{1.2}SiO_5$ | 0.001Ce | 0.001Ti | 35 |
| 28. | $Y_{0.8}Lu_{1.2}SiO_5$ | 0.01Ce | 0.001Ti | 7 |
| 29. | $Y_2SiO_5$ | 0.001Ce | 0.001Eu | 4 |
| 30. | $Y_2SiO_5$ | 0.001Ce | 0.001Yb | 35 |

TABLE 1-continued

| Comp. | Matrix | Activator 1 | Activator 2 | Emission efficiency |
|---|---|---|---|---|
| 31. | $Y_2SiO_5$ | 0.001Ce | 0.001Ti | 29 |
| 32. | $Gd_2SiO_5$ | 0.001Ce | 0.001Sm | 25 |
| 33. | $Y_{0.4}Gd_{1.6}SiO_5$ | 0.001Ce | 0.001Sm | 50 |
| A. | $Y_2SiO_5$ | 0.001Ce | | 3 |

The emission efficiency value of the phosphor of the present invention shown as no. 1 of Table 1 was placed equal to 100 to favor the comparison with the emission values of the other compounds of the present invention (Compounds nos. 2 to 26), of Compound A known in the art (see German patent 2,202,485) and of additional compounds not useful in the present invention (Compounds 27 to 33). The data of Table 1 show that the phosphors obtained with the addition of cerium and/or terbium, as first activators, and with zirconium or samarium, as second activator, to the rare earth orthosilicate phosphor matrix, wherein the rare earth is one of (a) yttrium, (b) yttrium and lutetium and (c) yttrium, lutetium and gadolinium, present a very high emission efficiency when stimulated with a laser beam having a wavelength of 514.5 nm.

The emission efficiency of Reference Compound A, having cerium as first activator and no second activator to the same rare earth orthosilicate matrix as above, is on the contrary very low. This fact shows that the rare earth orthosilicate matrix phosphors require the presence in the host of couples of activators to be efficiently photostimulated and to emit light. The problem is to find couples effectively able to work in the specific field of the host compound. Infact, the emission efficiency of the phosphors obtained with the addition of Ce, as first activator, but with Eu, Ti or Yb, as second activator (instead of Zr and/or Sm), to the same rare earth orthosilicate matrix (Compounds nos. 27 to 31), was not so good as the-efficiency of the phosphors nos. 1 to 26 of the present invention.

Consequently, the addition of Zr and/or Sm, as second activators, is to be considered of fundamental importance in order to obtain high efficiency emission when the rare earth orthosilicate phosphors, having Ce and/or Tb as first activators, are stimulated at 514.5 nm.

In addition, compounds nos. 32 and 33 of the previous Table 1. in which the gadolinium element is present in the rare earth orthosilicate matrix alone or in combination with the yttrium element, has not shown a good emission efficiency, even if they are activated with cerium, as first activator, and with samarium, as second activator. This fact shows that the rare earth orthosilicate matrix of the present invention is the matrix in which is present the yttrium element, preferably in combination with the lutetium element, or in combination with lutetium and gadolinium elements of compounds nos. 1 to 26 of previous Table 1.

EXAMPLE 6

Reference phosphor A and phosphor samples (Compounds nos. 1 to 33 of following Table 2), obtained with the preparations described in Examples 1 to 4, were for 10 seconds exposed to 40 KVp and 10 mA x-rays filtered with 1 mm Be. After 2 minutes such samples were stimulated for 2 seconds with a 800 nm wavelength light beam emitted by a QJ 100 W 12 V lamp and passed through a 03 FII 004 narrow band filter (Melles Griot) having a 60% peak transmittance, placed between the light source and the sample. The intensity of the stimulating light was measured with a photometer (Mod. 450-1 Photometer of EG&G, Eletrooptics), connected with an attenuator (Mod. 550-11 of the same firm). The photostimulated light emitted by the phosphor was collected with a photomultiplier (Thorn-Emi 9635 QB type) and converted into electrical signals. The electrical signal was amplified by means of a combination of a EG&G Parc Model 181 type pre-amplifier and a EG&G Parc Model 113 type amplifier. The signal was then evaluated with a Data Precision 6000 type data analyzer of Division Analogic Corp.

The following Table 2 reports the emission values of the photostimulated light emitted by the phosphors prepared according to Examples 1 to 4 and treated as described in Example 6,(stimulated at 800 nm).

TABLE 2

| Comp. | Matrix | Activator 1 | Activator 2 | Emission efficiency |
|---|---|---|---|---|
| 1. | $Y_2SiO_5$ | 0.001Ce | 0.001Sm | 100 |
| 3. | $Y_{0.8}Lu_{1.2}SiO_5$ | 0.001Ce | 0.001Sm | 230 |
| 13 | $Y_{1.2}Lu_{0.8}SiO_5$ | 0.001Ce | 0.001Sm | 130 |
| 14. | $Y_{0.9}Lu_{0.3}Gd_{0.8}SiO_5$ | 0.001Ce | 0.001Sm | 100 |
| 15. | $Y_{0.3}Lu_{0.9}Gd_{0.8}SiO_5$ | 0.001Ce | 0.001Sm | 120 |
| 16. | $Y_2SiO_5$ | 0.001Ce | 0.001Zr 0.001Sm | 80 |
| 17. | $Y_2SiO_5$ | 0.001Tb | 0.001Sm | 130 |
| 18. | $Y_2SiO_5$ | 0.001Ce | 0.001Sm 0.001Tb | 45 |
| 27. | $Y_{0.8}Lu_{1.2}SiO_5$ | 0.001Ce | 0.001Ti | 2 |
| 28. | $Y_{0.8}Lu_{1.2}SiO_5$ | 0.01Ce | 0.001Ti | 1 |
| 29. | $Y_2SiO_5$ | 0.001Ce | 0.001Eu | 0.2 |
| 30. | $Y_2SiO_5$ | 0.001Ce | 0.001Yb | 0.2 |
| 31. | $Y_2SiO_5$ | 0.001Ce | 0.001Ti | 0 |
| 32. | $Gd_2SiO_5$ | 0.001Ce | 0.001Sm | 2 |
| 33. | $Y_{0.4}Gd_{1.6}SiO_5$ | 0.001Ce | 0.001Sm | 1 |
| A. | $Y_2SiO_5$ | 0.001Ce | — | 0.5 |

The emission efficiency value of the phosphor of the present invention shown as no. 1 of Table 2 was placed equal to 100 to favor the comparison with the emission values of the other compounds of Table 2.

The data of Table 2 show that the phosphors obtained with the addition of Ce and/or Tb, as first activator, and with Sm, as second activator, to the rare earth orthosilicate phosphor matrix present a very high emission efficiency when stimulated at 800 nm.

The emission efficiency of reference Compound A, having cerium as first activator and no second activator to the same rare earth orthosilicate matrix as above, is on the contrary very low. This fact shows that, as in the case of Table 1,where the phosphors were stimulated by a laser beam having a wavelength of 514.5 nm, also in the case of the phosphors stimulated at 800 nm, whose emission efficiency is shown in Table 2,the rare earth orthosilicate matrix phosphors require the presence in the host of preferred couples of activators to be efficiently photostimulated and to emit light.

The emission curves of the phosphors of the present invention have a band or emission peak at about 400 nm; the shape of such curves is very narrow (about 80% of the signal is emitted between 370 and 480 nm).

The evaluation of the signal emitted by the phosphors required the use of means (Schott BG-1 filter with 8.5 mm opening and Thorn-Emi 9635 QB photodetector) which collected only such a signal and not the signal given by the stimulating radiation by the phosphor.

I claim:

1. A method for recording and reproducing a radiation image comprising the steps of (i) causing a visible or infrared radiation stimulable phosphor to absorb a high-energy radiation passing through an object, (ii) stimulating said phosphor with visible or infrared radiation to release the stored energy as fluorescent light and (iii) detecting said fluorescent light with light detecting means, characterized by the fact that said phosphor is selected from the group of rare earth orthosilicates activated with a first activator of cerium and/or terbium and a second activator of zirconium and/or samarium, wherein the rare earth is one of (a) yttrium, (b) yttrium and lutetium and (c) Yttrium, lutetium and gadolinium and is represented by the formula:

$$Y_xLu_yGd_zSiO_5{:}aA,bB$$

wherein $x+y+z=2$, $x>0$, $y\geq 0$, $1\geq 0$, A is a cerium and/or terbium, B is zirconium and/or samarium, $2\times 10^{-5}<a<0.02$ and $2\times 10^{-5}<b<0.02$, said phosphor being stimulated by radiation having a wavelength in the range from 480 to 1,000 nm.

2. The method for recording and reproducing a radiation image as defined in claim 1, where said phosphor is stimulated by a radiation having a wavelength in the range from 480 to 600 nm.

3. The method for recording and reproducing a radiation image as defined in claim 1, where said phosphor is stimulated by a radiation having a wavelength in the range from 500 to 550 nm.

4. The method for recording and reproducing a radiation image as defined in claim 1, where said phosphor is stimulated by a radiation having a wavelength in the range from 750 to 1000 nm.

5. The method for recording and reproducing a radiation image as defined in claim 4, wherein said phosphor is represented by the formula:

$$Y_xLu_yGd_zSiO_5{:}aA,bSm \qquad (2)$$

wherein $x+y+z=2, x>0, y\geq 0, z\geq 0$, A is cerium and/or terbium, $2\times 10^{-5}<a<0.02$ and $2\times 10^{-5}<b<0.02$.

6. A radiation image storing panel having a fluorescent layer comprising a binder and a stimulable phosphor dispersed therein, characterized by the fact that said phosphor is selected from the group of rare earth orthosilicates activated with a first activator of cerium and/or terbium and with a second activator of zirconium and/or samarium, wherein said rare earth is one of (a) yttrium, (b) yttrium and lutetium and (c) yttrium, lutetium and gadolinium and is represented by the formula:

$$Y_xLu_yGd_zSiO_5{:}aA,bB$$

wherein $x+y+z=2$, $x>0$, $y\geq 0$, $z\geq 0$, A is cerium and/or terbium, B is zirconium and/or samarium, $2\times 10^{-5}<a<0.02$ and $2\times 10^{-5}<b<0.02$.

7. A rare earth orthosilicate phosphor activated with a first activator of cerium and/or terbium and with a second activator of zirconium and/or samarium wherein the rare earth is one of (a) yttrium, (b) yttrium and lutetium and (c) yttrium, lutetium and gadolinium and is represented by the formula:

$$Y_xLu_yGd_zSiO_5{:}\ aA,bB$$

wherein $x+y+z=2$, $x>0$, $y\geq 0$, $z\geq 0$, A is cerium and/or terbium, B is zirconium and/or samarium, $2\times 10^{-5}<a<0.02$ and $2\times 20^{-5}<b<0.02$.

* * * * *